(12) United States Patent
Nakaya (10) Patent No.: US 10,816,157 B2
(45) Date of Patent: Oct. 27, 2020

(54) VEHICULAR ILLUMINATION DEVICE

(71) Applicant: MAZDA MOTOR CORPORATION, Hiroshima (JP)

(72) Inventor: Yoshiaki Nakaya, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/523,446

(22) Filed: Jul. 26, 2019

(65) Prior Publication Data

US 2020/0041091 A1 Feb. 6, 2020

(30) Foreign Application Priority Data

Aug. 6, 2018 (JP) .................................. 2018-147453
Aug. 6, 2018 (JP) .................................. 2018-147456

(51) Int. Cl.
*F21S 41/24* (2018.01)
*F21S 41/33* (2018.01)
(Continued)

(52) U.S. Cl.
CPC .............. *F21S 41/24* (2018.01); *F21S 41/141* (2018.01); *F21S 41/28* (2018.01); *F21S 41/33* (2018.01); *F21Y 2115/10* (2016.08)

(58) Field of Classification Search
CPC .... B60Q 1/0041; F21S 41/255; F21S 41/141; F21S 41/24
See application file for complete search history.

(56) References Cited

U.S. PATENT DOCUMENTS 9,651,212 B1 5/2017 Wasilewski et al.
2010/0202153 A1 8/2010 Schwab
(Continued)

FOREIGN PATENT DOCUMENTS

DE 102013017859 A1 7/2014
EP 2624027 A1 8/2013
(Continued)

OTHER PUBLICATIONS

Extended European Search Report issued by the European Patent Office dated Sep. 30, 2019, which corresponds to EP19188281.0-1012 and is related to U.S. Appl. No. 16/523,446.

*Primary Examiner* — Evan P Dzierzynski
(74) *Attorney, Agent, or Firm* — Studebaker & Brackett PC (57) ABSTRACT

Provided is a vehicular illumination device including a light emitting portion mounted on a headlight, and capable of outputting light from the light emitting portion forwardly of a vehicle with enhanced design and enhanced visibility. An illumination device is provided on a front portion of a vehicle, and includes a headlight, a light guide, and an outer glass. The outer glass is configured such that a perimeter portion and a front surface portion are integrally formed. The perimeter portion includes an incident portion on a middle portion in a length direction of the light guide, the incident portion allowing incidence of light output from the light guide. The light guide is disposed in proximate to the incident portion. Light incident from the light guide to the perimeter portion is guided forwardly, while repeating reflection on inner and outer circumferential surfaces of the perimeter portion, and output forwardly from an output portion formed on the front side.

16 Claims, 8 Drawing Sheets

(51) Int. Cl.
*F21S 41/20* (2018.01)
*F21S 41/141* (2018.01)
*F21Y 115/10* (2016.01)

(56) References Cited

U.S. PATENT DOCUMENTS

| | | | |
|---|---|---|---|
| 2011/0194301 A1* | 8/2011 | Schneider | B60Q 1/0041 |
| | | | 362/511 |
| 2013/0051050 A1* | 2/2013 | Yang | F21S 43/245 |
| | | | 362/516 |
| 2016/0102834 A1 | 4/2016 | Yamada et al. | |
| 2016/0347234 A1 | 12/2016 | Herbin et al. | |
| 2017/0205043 A1* | 7/2017 | Tokieda | B60Q 1/34 |

FOREIGN PATENT DOCUMENTS

| | | |
|---|---|---|
| EP | 2839989 A1 | 2/2015 |
| EP | 3098500 A1 | 11/2016 |
| EP | 3252368 A1 | 12/2017 |
| JP | 2014-164975 A | 9/2014 |
| JP | 2015-133219 A | 7/2015 |
| JP | 2016-091846 A | 5/2016 |
| JP | 2018-032512 A | 3/2018 |

\* cited by examiner

VEHICULAR ILLUMINATION DEVICE

FIELD OF THE INVENTION

The present invention relates to a vehicular illumination device, and more particularly relates to an illumination device provided on a front portion of a vehicle, and including a headlight and a light emitting portion mounted on the headlight.

DESCRIPTION OF RELATED ART

In a vehicle such as an automobile, a headlight is disposed on a front portion of the vehicle. In recent years, a vehicle in which a plurality of light emitting portions are mounted on a headlight has been developed.

For example, Japanese Unexamined Patent Application Publication No. 2018-32512 discloses an illumination device in which a headlight, and a daytime running lamp mounted on the headlight are accommodated inside a housing. The illumination device disclosed in Japanese Unexamined Patent Application Publication No. 2018-32512 is configured such that a daytime running lamp includes a rod-shaped light guide and a light source for outputting light to the light guide.

In the illumination device disclosed in Japanese Unexamined Patent Application Publication No. 2018-32512, driving a light source to emit light allows light to be output from a light guide inside a housing, and the output light is output forwardly of a vehicle through an outer glass formed on a front portion of the housing.

However, in the illumination device disclosed in Japanese Unexamined Patent Application Publication No. 2018-32512, since light from a daytime running lamp accommodated inside a housing is output forwardly through an outer glass, there is room for improvement in terms of design. Specifically, a daytime running lamp emits light inside a housing, and output light is radiated forwardly through an outer glass. This makes it difficult to achieve enhanced design.

Further, in the illumination device disclosed in Japanese Unexamined Patent Application Publication No. 2018-32512, since a daytime running lamp radiates deep inside an outer glass, there is also room for improvement in terms of visibility from a front side of a vehicle. Specifically, regarding the illumination device disclosed in Japanese Unexamined Patent Application Publication No. 2018-32512, a vehicle preceding the vehicle mounted with the illumination device, an oncoming vehicle, and a pedestrian ahead of the vehicle may recognize a daytime running lamp which radiates light deep inside an outer glass. This may degrade visibility of the vehicle.

An object of the present invention is to provide a vehicular illumination device including a light emitting portion mounted on a headlight, and capable of outputting light from the light emitting portion forwardly of a vehicle with enhanced design and enhanced visibility.

SUMMARY OF THE INVENTION

A vehicular illumination device according to the present invention is a vehicular illumination device provided on a front portion of a vehicle. The illumination device includes: a headlight as a first light source portion capable of radiating light forwardly of the vehicle; an outer glass having light transparency and including a front surface portion for covering a front portion of the headlight and a perimeter portion for surrounding a periphery of the headlight; a second light source portion provided separately of the headlight; and a light guide disposed in contact with or proximate to a part of the perimeter portion of the outer glass, and configured to allow incidence of light output from the second light source portion and output the incident light to the perimeter portion, while guiding the incident light.

DETAILED DESCRIPTION OF THE EMBODIMENT

In the following, an embodiment of the present invention is described with reference to the drawings. Note that an embodiment described in the following is an example of the present invention. The present invention is not limited to the following embodiment except for an essential configuration thereof.

Note that, in the drawings to be referred to in the following description, "FR" denotes a front side of a vehicle (a traveling direction), "RE" denotes a rear side of the vehicle, "LE" denotes a left side of the vehicle, "RI" denotes a right side of the vehicle, "UP" denotes an upper side of the vehicle, and "LO" denotes a lower side of the vehicle.

Embodiment

1. Configuration of Vehicular Front Portion 1a

A configuration of a vehicular front portion 1a of a vehicle 1 according to an embodiment is described with reference to FIG. 1.

Figure 1:
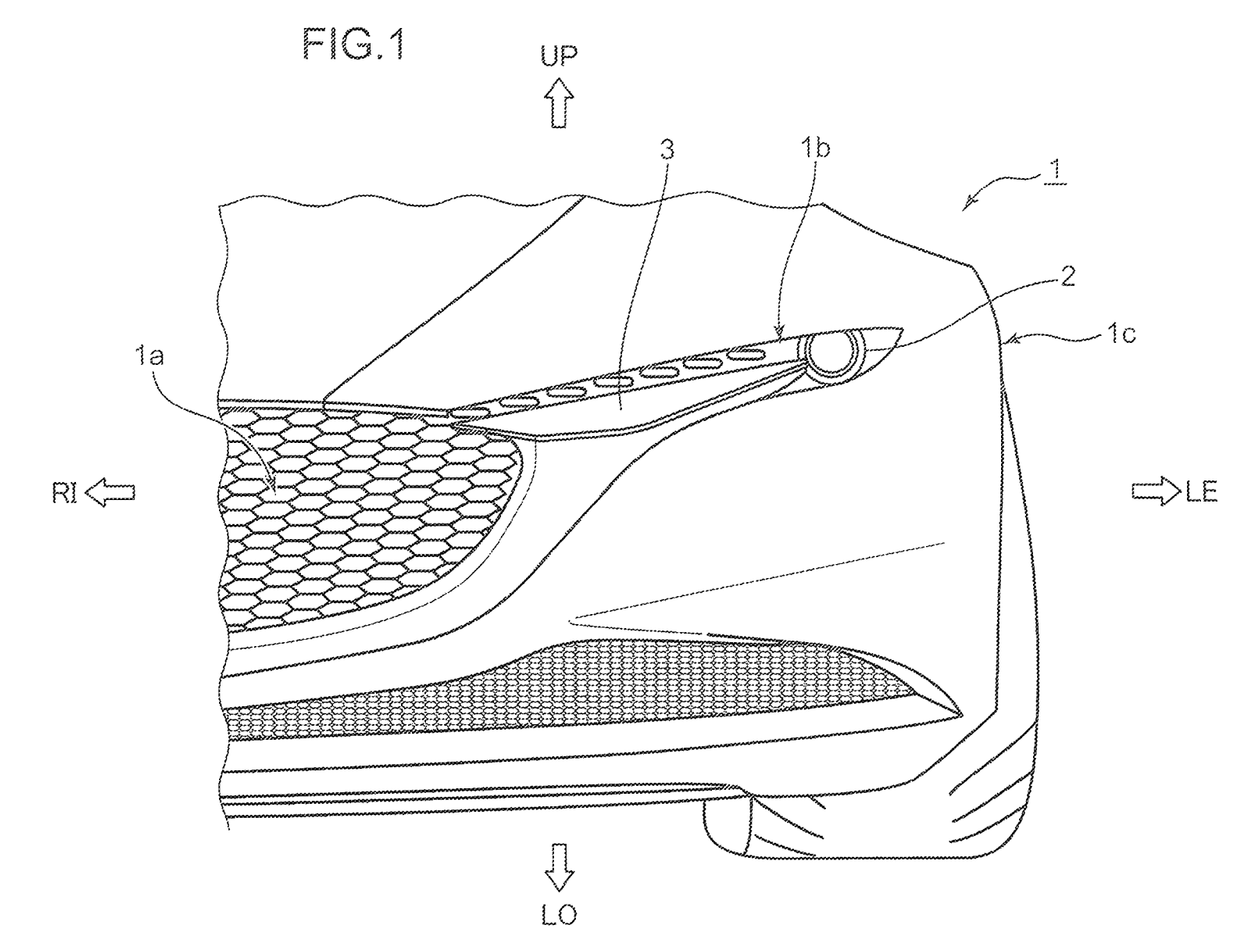
FIG. 1 is a schematic front view illustrating a configuration of a front portion of a vehicle according to an embodiment.

As illustrated in FIG. 1, a recess portion 1b recessed rearwardly of the vehicle 1 is formed in an end portion (in FIG. 1, a left side portion) of the vehicular front portion 1a of the vehicle 1 in a vehicle width direction. The recess portion 1b has an elongated shape in a lateral direction from a middle portion of the vehicle 1 in the vehicle width direction toward a vehicular side portion 1c in a front view when viewed from the front side of the vehicle 1.

An illumination device 2 and a signature wing (a registered trademark of Mazda Motor Corporation) 3 are disposed in a rear portion of the recess portion 1b (a portion on the rear side on the plane of FIG. 1).

The signature wing 3 is an exterior member (a garnish) for decorating the vehicular front portion 1a of the vehicle 1. The signature wing 3 exhibits a high decorative effect not only in a daytime but also in a nighttime by causing a wing light emitting portion 4 to be described later and incorporated in the signature wing 3 to emit light.

The signature wing 3 includes a plate-shaped wing portion extending with a small width along the recess portion 1b. Further, the signature wing 3 is formed to extend from the rear side of the recess portion 1b outwardly (forwardly of the vehicle 1).

2. Layout Configuration of Illumination Device 2 and Signature Wing 3

Figure 2:
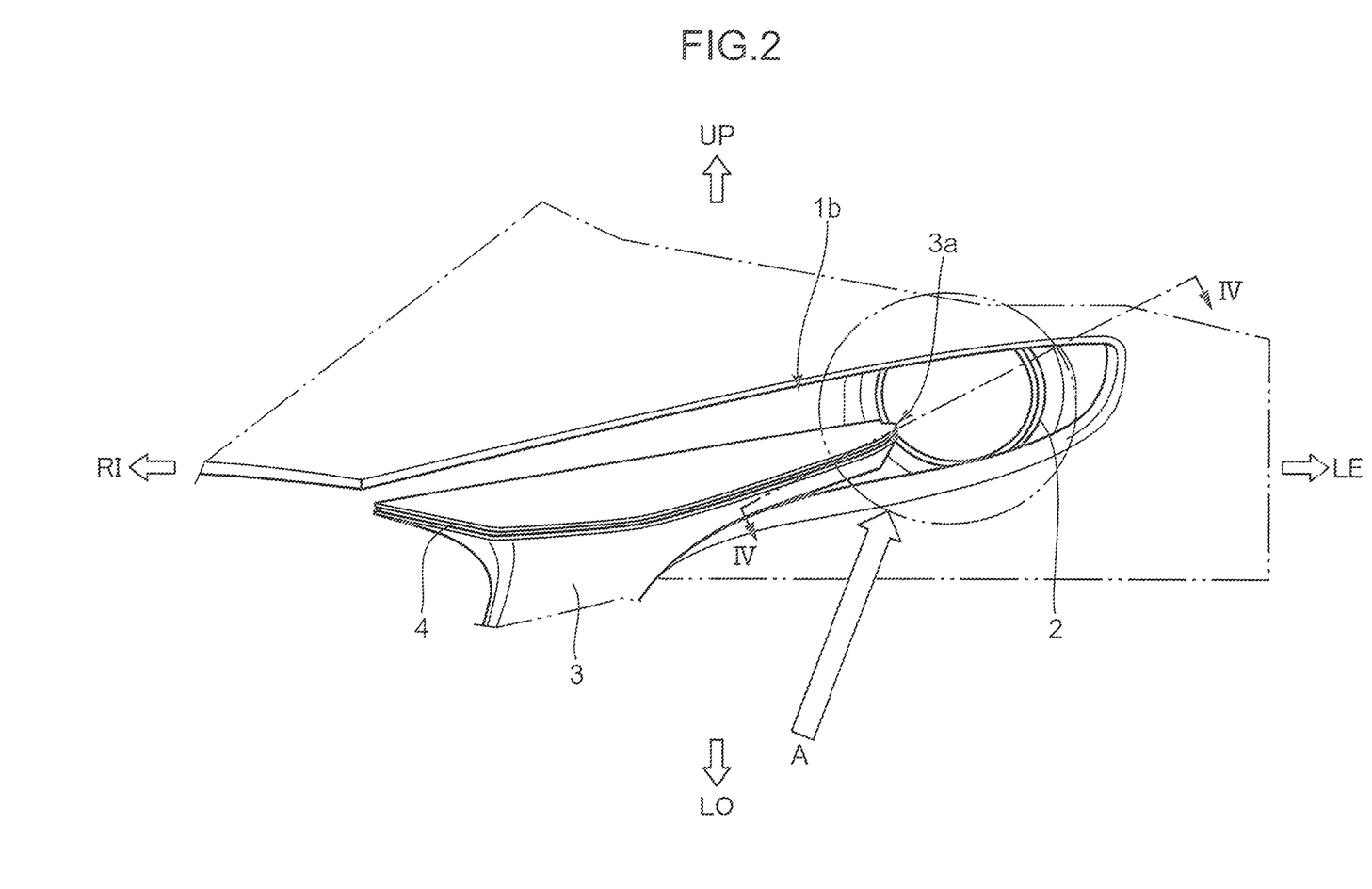
FIG. 2 is a schematic front view illustrating a layout relationship between an illumination device and a signature wing.
Figure 3:
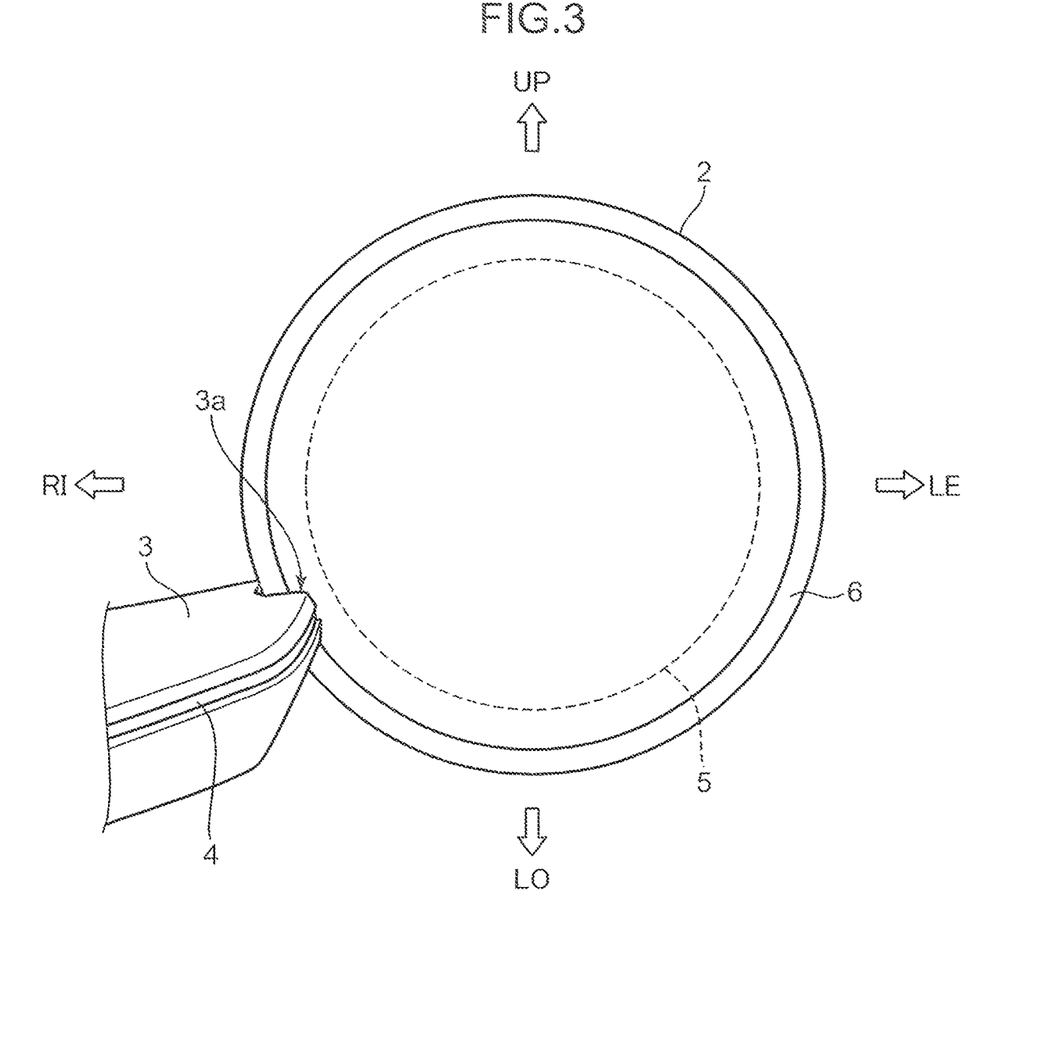
FIG. 3 is a schematic diagram schematically and enlargedly illustrating a portion A in FIG. 2.

A layout configuration of the illumination device 2 and the signature wing 3 is described with reference to FIGS. 2 and 3. FIG. 2 is a schematic front view illustrating a layout configuration of the illumination device 2 and the signature wing 3. FIG. 3 is a schematic diagram schematically and enlargedly illustrating a portion A in FIG. 2.

As illustrated in FIG. 3, the illumination device 2 according to the present embodiment includes a headlight 5 as a first light source portion, and an annular light emitting portion 6 and the wing light emitting portion 4. Further, as illustrated in FIGS. 2 and 3, a part of a circumference of the annular light emitting portion 6 is covered by a distal end portion 3a of the signature wing 3 from the front side.

The headlight 5 has a substantially circular shape in a front view as an external appearance. The annular light emitting portion 6 is formed into an annular shape in such a way as to surround an outer circumference of the headlight 5 in a front view.

On the other hand, the wing light emitting portion 4 is formed along a front end portion (a peak portion protruding most forwardly of the vehicle 1) of the signature wing 3.

Note that each of the annular light emitting portion 6 and the wing light emitting portion 4 in the present embodiment corresponds to a light emitting portion mounted on the headlight 5.

3. Internal Configuration of Illumination Device 2

Figure 4:
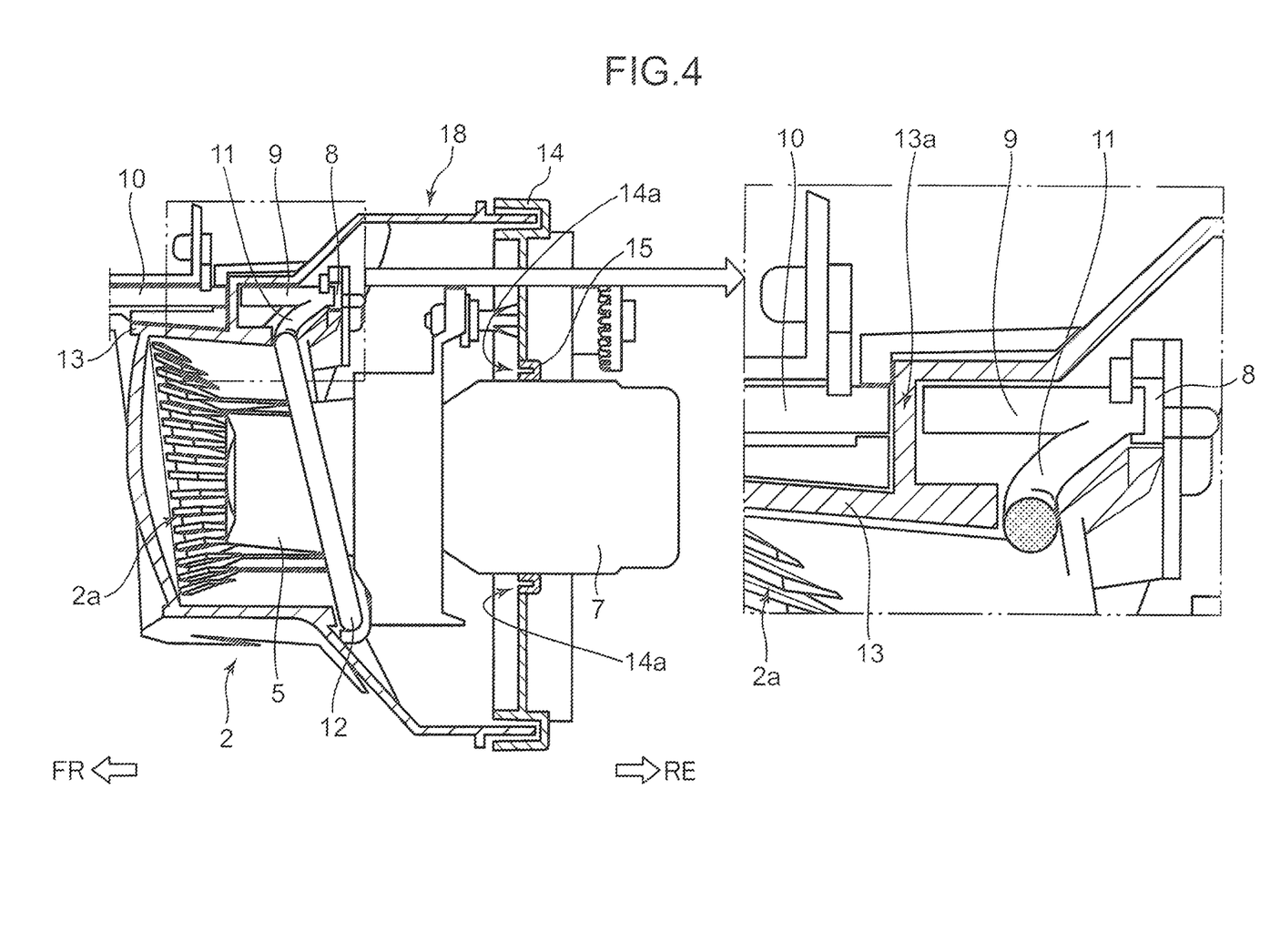
FIG. 4 is a diagram illustrating a IV-IV section in FIG. 2, and is a schematic cross-sectional view illustrating an internal configuration of the illumination device.

An internal configuration of the illumination device 2 is described with reference to FIG. 4. FIG. 4 is a schematic cross-sectional view illustrating a IV-IV section in FIG. 2.

As illustrated in FIG. 4, the illumination device 2 includes the headlight 5 inside a light chamber 2a. A heat sink 7 for releasing heat generated when the headlight 5 is turned on to the outside is provided on a rear portion of the headlight 5. A part of the heat sink 7 extends rearwardly from the light chamber 2a.

The light chamber 2a is an internal space of a housing 18, which is constituted by combining an outer glass 13 and a back surface case 14. The outer glass 13 has a bottomed tubular shape, and covers a front surface and a side surface of the headlight 5. Note that the heat sink 7 extends rearwardly through an opening portion 14a formed in the back surface case 14. Note that the outer glass 13 may be a transparent or semi-transparent member, and is not limited to a member made of glass. Therefore, the outer glass 13 may be made of plastic.

Herein, a clearance between the back surface case 14 and the heat sink 7 is sealed by an elastically deformable seal member 15.

An annular-shaped light guide 12 is also disposed inside the light chamber 2a in such a way as to surround an outer circumference of the headlight 5. The light guide 12 corresponds to a first light guide. Further, a second light source portion 8 constituted by one or more semiconductor light emitting elements (e.g., LED chips), as a light source portion separately of the headlight 5 serving as a first light source portion, a linearly and forwardly extending light guide 9 disposed in contact with or proximate to the second light source portion 8, and a light guide 11 for connecting the light guide 9 and the light guide 12 are also disposed inside the light chamber 2a.

As illustrated by an enlarged portion in FIG. 4, the illumination device 2 also includes a light guide 10. The light guide 10 corresponds to a second light guide, and includes an end surface facing an end surface of the light guide 9 in a state that an interposing portion 13a of the outer glass 13 is interposed between the light guides 9 and 10. A part of light from the second light source portion 8 is guided from the light guide 9 to the light guide 10 through the outer glass 13.

Herein, the annular light emitting portion 6 is constituted by the light guide 12, and the wing light emitting portion 4 is constituted by the light guide 10. The light guide 10 extends along a front end portion of the signature wing 3, and outputs light guided from the light guide 9 forwardly of the vehicle 1, while guiding the light along the front end portion of the signature wing 3.

4. Configuration of Light Guides 9, 11, and 12

Figure 5:
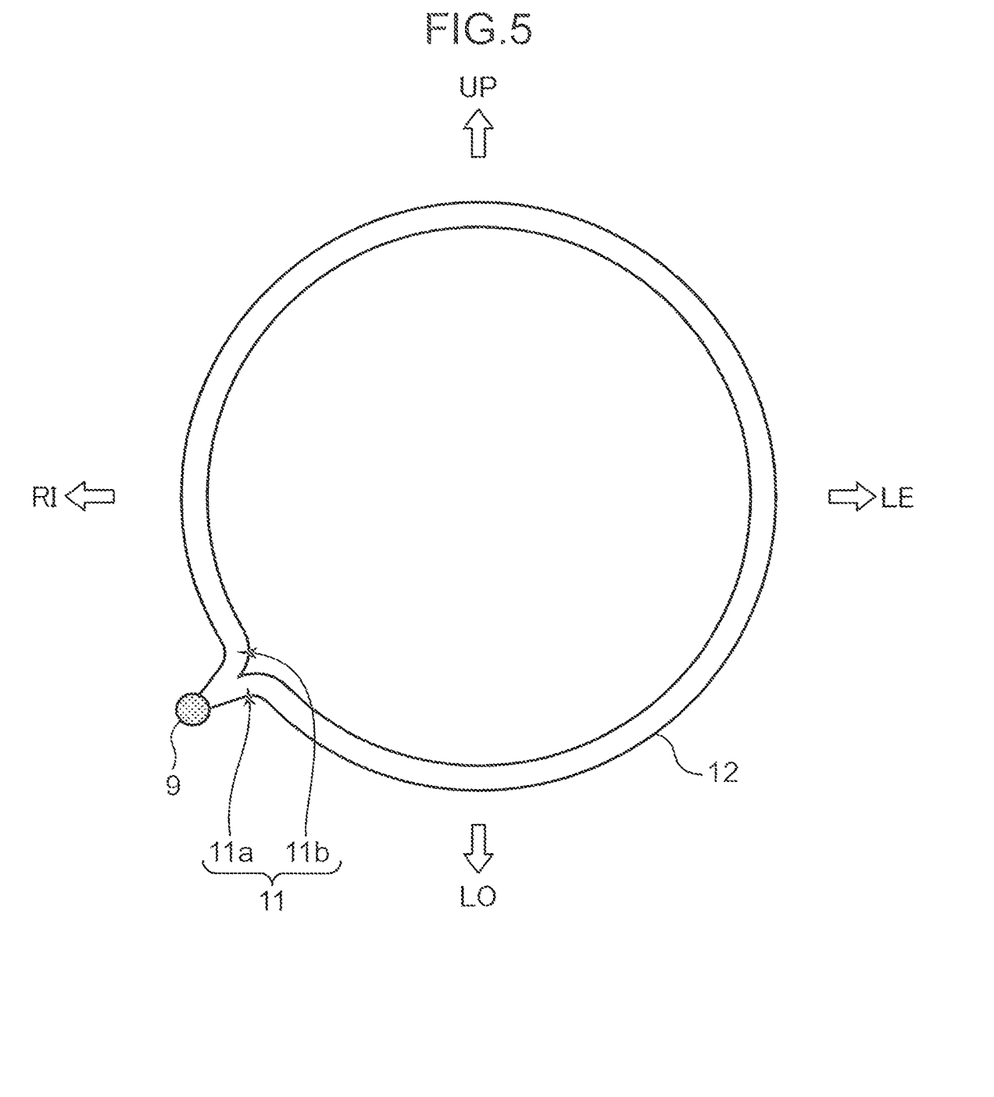
FIG. 5 is a schematic front view illustrating a configuration of a light guide disposed to surround a periphery of a headlight.

A configuration of the light guides 9, 11, and 12 is described with reference to FIG. 5. FIG. 5 is a schematic front view illustrating a configuration of the light guides 9, 11, and 12.

As illustrated in FIG. 5, the light guide 11 is formed to be branched from (connected to) the light guide 9, which extends forwardly from the rear side of the illumination device 2.

The light guide 11 includes two branch portions 11a and 11b. One of the two branch portions 11a and 11b, namely, the first branch portion 11a is connected in such a way that light is guided to one side (a clockwise side) in a circumferential direction of the annular-shaped light guide 12.

On the other hand, the other of the two branch portions 11a and 11b, namely, the second branch portion 11b is connected in such a way that light is guided to the other side (a counterclockwise side) in the circumferential direction of the annular-shaped light guide 12.

Note that, as described above, a connecting portion between the light guide 9, and each of the first and second branch portions 11a and 11b, and a connecting portion of each of the first and second branch portions 11a and 11b with respect to the light guide 12 are covered by the distal end portion 3a of the signature wing 3 from the front side.

5. Light Emitting Pattern of Annular Light Emitting Portion 6

Figure 6:
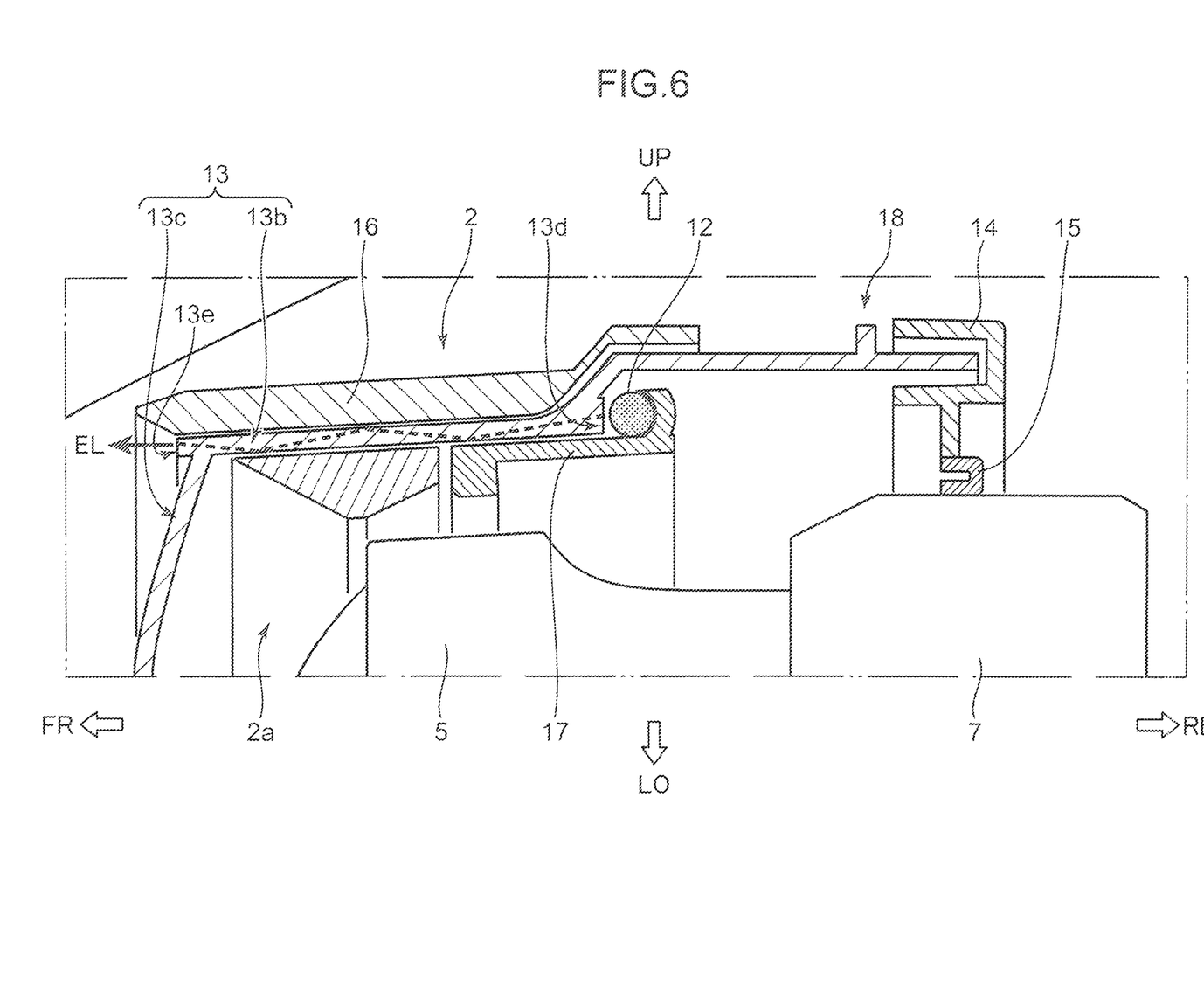
FIG. 6 is a schematic cross-sectional view illustrating a light path of light output from an annular-shaped light guide.

A light emitting pattern of the annular light emitting portion 6 is described with reference to FIG. 6. FIG. 6 is a schematic cross-sectional view illustrating a light path of light output from the light guide 12 forwardly.

As illustrated in FIG. 6, as described above, the outer glass 13 is configured in such a way that a perimeter portion 13b and a front surface portion 13c are formed integrally with each other. In the light chamber 2a, the light guide 12 is disposed in such a way as to surround a periphery of the headlight 5 in a state that the light guide 12 is spaced away from the headlight 5. The light guide 12 is supported by a guide support portion 17, which is formed along an inner portion of the perimeter portion 13b of the outer glass 13.

A part of an outer circumference of the perimeter portion 13b of the outer glass 13 is covered by an outer case 16. The outer circumferential part of the perimeter portion 13b of the outer glass 13, which is covered by the outer case 16, is a portion on the front side with respect to a portion where the light guide 12 is disposed inside the light chamber 2a.

Next, light guided through the light guide 12 is output forwardly from the entirety in a circumferential direction of the light guide 12. Light output forwardly from the light guide 12 is guided to an inner portion of the perimeter portion 13b of the outer glass 13 from an incident portion 13d of the outer glass 13, which faces the front side of the light guide 12.

As illustrated by the broken line, on an inner portion of the perimeter portion 13b of the outer glass 13, light is guided forwardly, while repeating reflection on a radially inner peripheral surface and a radially outer peripheral surface of the perimeter portion 13b. Further, the guided light (EL) is output forwardly of the vehicle 1 from an output portion 13e, which is a front end portion of the perimeter portion 13b of the outer glass 13.

Note that, in the illumination device 2 according to the present embodiment, the output portion 13e of the perimeter portion 13b is disposed to project forwardly with respect to a connecting portion between the perimeter portion 13b and the front surface portion 13c. Therefore, light guided inside the perimeter portion 13b is output from the output portion 13e formed on the front side with respect to the connecting portion between the perimeter portion 13b and the front surface portion 13c.

Herein, FIG. 6 illustrates a part of a cross section of the illumination device 2. A configuration of the light guide 12 and the perimeter portion 13b is similar to the above in an whole area in a circumferential direction.

6. Configuration of Reflecting Portion 12a of Light Guide 12

Figure 7:
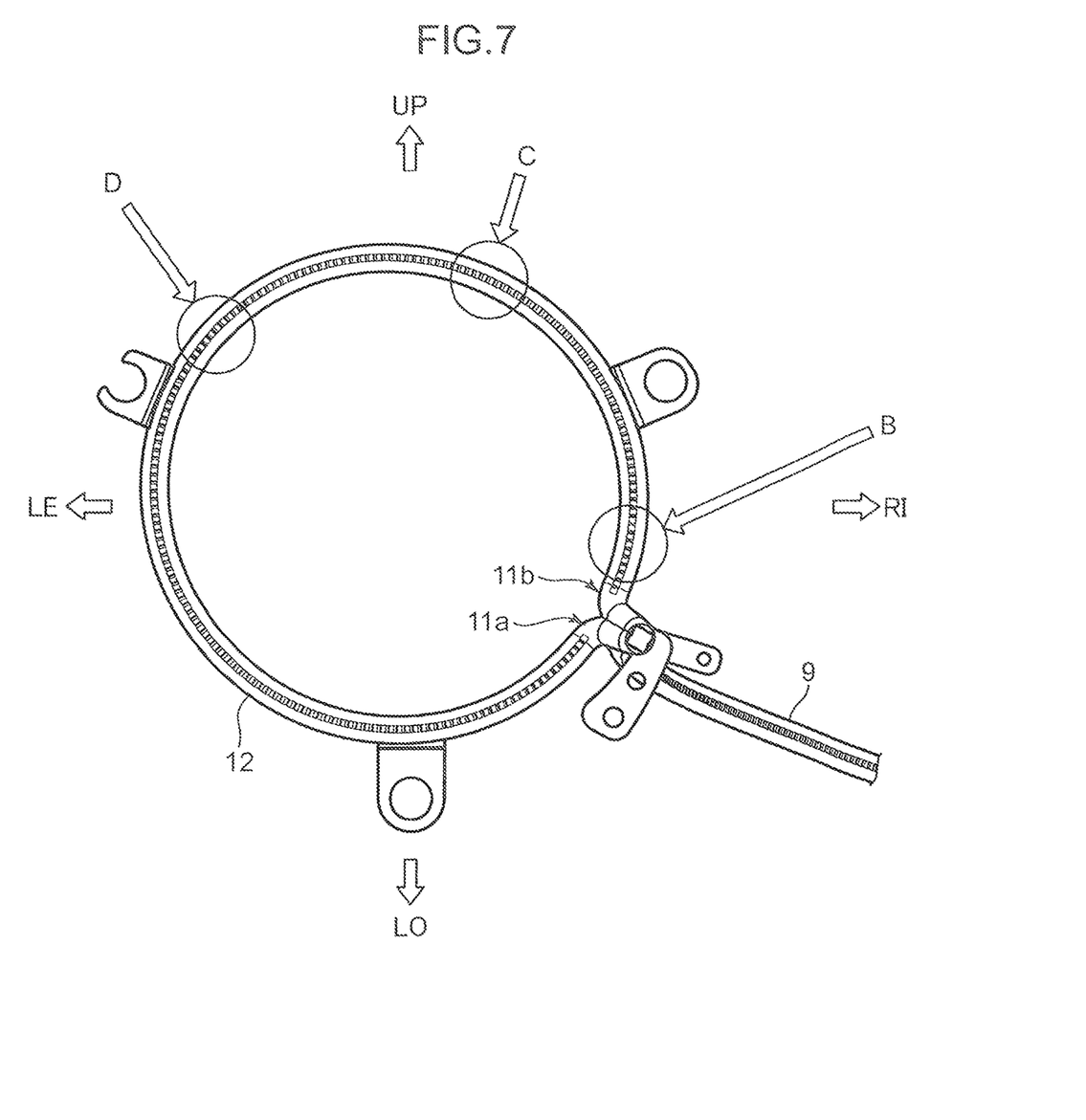
FIG. 7 is a schematic rear view illustrating a configuration of the annular-shaped light guide.
Figure 8A:
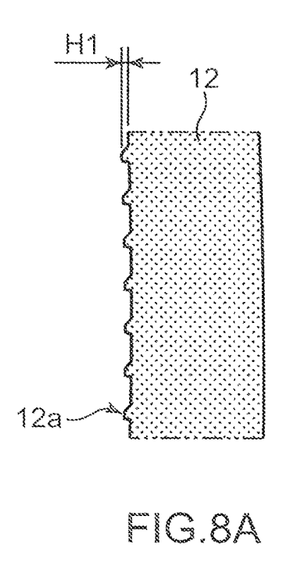
FIG. 8A is a schematic cross-sectional view illustrating a cross-sectional configuration of a portion B in FIG. 7.
Figure 8B:
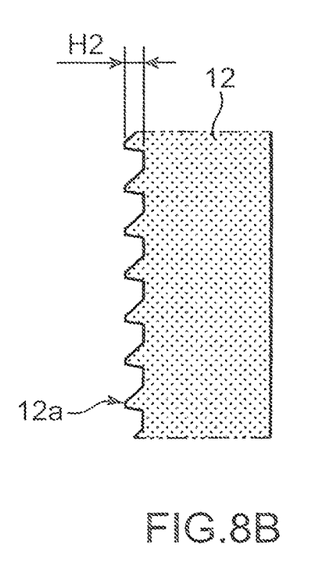
FIG. 8B is a schematic cross-sectional view illustrating a cross-sectional configuration of a portion C in FIG. 7.
Figure 8C:
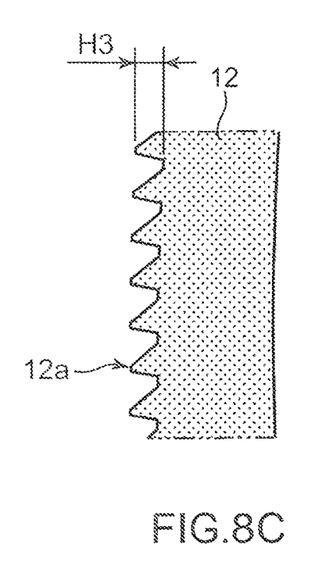
FIG. 8C is a schematic cross-sectional view illustrating a cross-sectional configuration of a portion D in FIG. 7.

A configuration of a reflecting portion 12a of the light guide 12 is described with reference to FIGS. 7 to 8C. FIG. 7 is a schematic rear view illustrating a configuration of the light guide 12, when viewed from a rear side. FIG. 8A is a schematic cross-sectional view illustrating a cross-sectional configuration of a portion B. FIG. 8B is a schematic cross-sectional view illustrating a cross-sectional configuration of a portion C. FIG. 8C is a schematic cross-sectional view illustrating a cross-sectional configuration of a portion D.

As illustrated in FIG. 7, the reflecting portion 12a having a convexo-concave structure is formed on a back surface portion of the light guide 12 in the present embodiment along a circumferential direction.

As illustrated in FIG. 8A, a convexo-concave height of the reflecting portion 12a is H1 at a portion B, which is proximate to a connecting portion between the first branch portion 11a and the second branch portion 11b. Further, a convexo-concave height of the reflecting portion 12a is H2 at a portion C, which is away from the connecting portion, and a convexo-concave height of the reflecting portion 12a is H3 at a portion D, which is further away from the connecting portion. H1, H2, and H3 satisfy the following relationship.

$$H1<H2<H3 \qquad \text{(Expression 1)}$$

Note that, as an example, H2 may be two to three times as high as H1, and H3 may be three to four times as high as H1.

In the light guide 12 in the present embodiment, forming the reflecting portion 12a whose convexo-concave height is gradually changed in a circumferential direction on a back surface portion enables to substantially uniformly adjust an intensity of light to be output forwardly in a circumferential direction of the light guide 12.

7. Advantageous Effects

In the illumination device 2 according to the present embodiment, when the second light source portion 8 is driven to emit light, light output from the second light source portion 8 is incident to the perimeter portion 13b of the outer glass 13 via the light guides 9, 11, and 12. Further, since the outer glass 13 has light transparency, light incident from the incident portion 13d is guided inside the perimeter portion 13b, and is output forwardly of the vehicle 1 from the output portion 13e.

Therefore, in the illumination device 2 according to the present embodiment, since light is output from the perimeter portion 13b itself of the outer glass 13, unlike the technique disclosed in Japanese Unexamined Patent Application Publication No. 2018-32512, it is possible to output light from the annular light emitting portion 6 mounted on the headlight 5 forwardly of the outer glass 13 with enhanced design and enhanced visibility.

Further, in the illumination device 2 according to the present embodiment, the light glass 12 is disposed in proximate to the incident portion 13d, which is formed on a middle portion of the perimeter portion 13b of the outer glass 13 in a front-rear direction (tubular axis direction), and the incident portion 13d of the perimeter portion 13b is formed into an annular shape in conformity with a shape (annular shape) of the light guide 12. Therefore, it is possible to efficiently allow incidence of light output from the light guide 12 to the perimeter portion 13b of the outer glass 13.

Note that it may be possible to employ a configuration in which the light guide 12 is in contact with the incident portion 13d of the outer glass 13.

In the illumination device 2 according to the present embodiment, forming the output portion 13e on a front end portion of the perimeter portion 13b of the outer glass 13 allows light to be output from a position further on a front side of the vehicle 1. This is advantageous in achieving enhanced design.

In the illumination device 2 according to the present embodiment, disposing the output portion 13e of the outer glass 13 at a position on a front side with respect to a connecting portion between the perimeter portion 13b and the front surface portion 13c allows light from the second light source portion 8 via the light guides 9, 11, and 12, and the perimeter portion 13b of the outer glass 13 to be more clearly visible. This is advantageous in achieving enhanced design.

Further, in the illumination device 2 according to the present embodiment, integrally forming the perimeter portion 13b and the front surface portion 13c of the outer glass 13 enables to suppress random reflection of light on a connecting portion between the perimeter portion 13b and the front surface portion 13c. This is more advantageous in achieving enhanced design.

In the illumination device 2 according to the present embodiment, forming the reflecting portion 12a having a convexo-concave structure on a back surface portion of the light guide 12 enables to more efficiently output light guided through the light guide 12 forwardly.

Further, in the illumination device 2 according to the present embodiment, as described with reference to FIG. 8, gradually changing a height of a convexo-concave structure constituting the reflecting portion 12a in a length direction (circumferential direction) of a light guide enables to uniformly or gradually change an intensity of output light in the length direction. This is more advantageous in achieving enhanced design.

Since the illumination device 2 according to the present embodiment includes the light guide 10 disposed outside the housing 18, and configured to allow incidence of a part of light output from the second light source portion 8 to emit light, it is possible to dispose the light emitting portions 4 and 6 mounted on the headlight 5 without increasing the number of light sources. This is more advantageous in achieving enhanced design.

Specifically, in the illumination device 2 according to the present embodiment, mounting the light guide 12 and the light guide 10 on the headlight 5 at a position near the headlight 5 allows light to be output forwardly from the light guide 12 and the light guide 10, when light is output from the second light source portion 8. Therefore, it is possible to let an oncoming vehicle, a pedestrian, and the like notify a position and a traveling direction of an own vehicle. This is advantageous in terms of function and design.

Further, in the illumination device 2 according to the present embodiment, distributing light output from the second light source portion 8 between the light guide 10 and the light guide 12 from the light guide 9 allows light to be output from the light guide 12 and the light guide 10. Therefore, in the illumination device 2 according to the present embodiment, unlike the technique disclosed in Japanese Unexamined Patent Application Publication No. 2018-32512 in which a second light source portion is provided for each light emitting portion, the number of second light source portions is one. This enables to reduce the weight and the production cost of the vehicle 1.

Furthermore, in the illumination device 2 according to the present embodiment, since the light guide (third light guide) 9, which extends forwardly of the vehicle 1 from a position where the second light source portion 8 is disposed, and the light guide (fourth light guide) 11, which is branched from the light guide 9 and is connected to the light guide (first light guide) 12 are integrally formed, light is guided in two directions, namely, toward one side and the other side of the light guide 12. Therefore, as compared with a case where light propagates through a space, the illumination device 2 according to the present embodiment is able to securely guide light to the light guide 12 and the light guide 10 with less attenuation.

Moreover, in the illumination device 2 according to the present embodiment, since light is guided in two directions, namely, toward one side and the other side of the light guide 12 in a circumferential direction by the first branch portion 11a and the second branch portion 11b of the light guide 11, as compared with a case where light is guided only toward one side or the other side of the light guide 12 in a circumferential direction, the illumination device 2 is more advantageous in outputting light of a uniform intensity from the entirety of the annular-shaped light guide 12, even when light is attenuated by guiding light.

Also, in the illumination device 2 according to the present embodiment, a front portion of a connecting portion between the light guide 11 (first and second branch portions 11a and 11b) and the light guide 12 is covered by the distal end portion 3a of the signature wing 3. Therefore, even when light emission fluctuates on each of the connecting portions, light is made invisible from the outside (from the front side of the vehicle 1), since the front portion of the connecting portion is covered by the distal end portion 3a of the signature wing 3.

In the illumination device 2 according to the present embodiment, since the light guide 12 of the annular light emitting portion 6 is disposed to surround a periphery of the headlight 5, when viewed from a front side, when light is output from the second light source portion 8, a part of the output light is guided to the light guide 12. Thus, the annular light emitting portion 6 annularly emits light in such a way as to surround a periphery of the headlight 5. Therefore, the illumination device 2 according to the present embodiment provides enhanced design.

Further, in the illumination device 2 according to the present embodiment, since the second light source portion 8 is constituted by one or more semiconductor light emitting elements (e.g., light emitting diodes (LEDs)), as compared with a case where a second light source portion is constituted by using a filament electric bulb or the like, it is possible to miniaturize the entirety of the illumination device 2, and secure a long product life.

As described above, in the illumination device 2 according to the present embodiment, it is possible to output light from the light emitting portion 6 forwardly of the vehicle 1 with enhanced design and enhanced visibility, while mounting the light emitting portion 6 on the headlight 5.

Further, in the illumination device 2 according to the present embodiment, disposing the annular light emitting portion 6 and the wing light emitting portion 4 mounted on the headlight 5 enables to reduce the weight and the production cost of the vehicle 1, while providing an enhanced function and enhanced design.

Modifications

In the illumination device 2 according to the embodiment, two light emitting portions, namely, the annular light emitting portion 6 constituted by the light guide 12 disposed to surround the periphery of the headlight 5, and the wing light emitting portion 4 constituted by the light guide 10 extending linearly and inwardly in a vehicle width direction along a front end portion of the signature wing 3 are employed, as light emitting portions mounted on the headlight 5. The present invention, however, is not limited to the above. For example, it may be possible to employ a configuration in which both of two light emitting portions are light emitting portions extending in a vehicle width direction. Further, it may be possible to employ a configuration in which a plurality of dot-shaped light emitting portions are mounted on a headlight. Furthermore, the illumination device 2 may include only the annular light emitting portion 6 as a light emitting portion.

Further, in the present invention, the light guide 12 may not surround the entire periphery of the headlight 5 necessarily. It may be possible to employ a configuration in which the light guide 12 partly surrounds the periphery of the headlight 5, or the light guide 12 does not surround the periphery of the headlight 5. For example, an annular-shaped light guide may be disposed adjacent to a headlight.

In the illumination device 2 according to the embodiment, a light source portion constituted by one or more LED elements is employed as the second light source portion 8 including the annular light emitting portion 6 and the wing light emitting portion 4. The present invention, however, is not limited to the above. For example, it may be possible to employ an organic EL element, an inorganic EL element, a semiconductor laser element, or the like, as a second light source portion.

In the illumination device 2 according to the embodiment, when light is output by driving the second light source portion 8, both of the annular light emitting portion 6 and the wing light emitting portion 4 are caused to emit light. The present invention, however, is not limited to the above. For example, an optical shutter may be provided between a second light source portion and a first light guide, and between the second light source portion and a second light guide, so that a first light emitting portion and a second light emitting portion are selectively caused to emit light.

In the illumination device 2 according to the embodiment, a light source of the headlight 5 is not specifically mentioned. Various types of light sources, however, may be employed. For example, an LED, an inorganic EL element and an organic EL element, or a semiconductor light emitting element such as a semiconductor laser element may be employed. Further, a halogen lamp, a high intensity discharge lamp, or the like may be employed.

In the illumination device 2 according to the embodiment, a wavelength of light to be output from the second light source portion 8 is not specifically mentioned. However, it may be configured to output only light of a predetermined wavelength (e.g., a wavelength of light of an orange color). Further, it may be configured to output light having wavelengths different from each other (e.g. a wavelength of light having a white color, and a wavelength of light having an orange color) by adjusting an application voltage or the like.

Further, it may be configured to intermittently output light from a second light source portion, or cause a plurality of light emitting portions or a part of light emitting portions to blink light.

The illumination device 2 according to the embodiment employs a configuration in which the perimeter portion 13b and the front surface portion 13c of the outer glass 13 are integrally formed. The present invention, however, is not limited to the above. For example, a perimeter portion and a front surface portion may be manufactured as individual parts, and an outer glass may be formed by joining or engaging the two parts to each other.

A vehicular illumination device described in relation to the embodiment mainly includes the following features.

A vehicular illumination device according to the embodiment is a vehicular illumination device provided on a front portion of a vehicle. The illumination device includes: a headlight as a first light source portion capable of radiating light forwardly of the vehicle; an outer glass having light transparency and including a front surface portion for covering a front portion of the headlight and a perimeter portion for surrounding a periphery of the headlight; a second light source portion provided separately of the headlight; and a light guide disposed in contact with or proximate to a part of the perimeter portion of the outer glass, and configured to allow incidence of light output from the second light source portion and output the incident light to the perimeter portion, while guiding the incident light.

In the vehicular illumination device according to this aspect, when the second light source portion is driven to emit light, light output from the second light source portion is incident to the perimeter portion of the outer glass via the light guide. Further, since the outer glass has light transparency, incident light is guided inside the perimeter portion, and at least a part of the incident light is output forwardly of the vehicle.

Therefore, in the vehicular illumination device according to this aspect, since light is output from the perimeter portion itself of the outer glass, unlike the technique disclosed in Japanese Unexamined Patent Application Publication No. 2018-32512, it is possible to output light from the light emitting portion mounted on the headlight forwardly of the vehicle 1 with enhanced design and enhanced visibility.

In the vehicular illumination device according to this aspect, the light guide may have an annular shape to surround a periphery of the headlight, the perimeter portion of the outer glass may have a tubular shape, and include, on a middle portion of the perimeter portion in a tubular axis direction, an annular-shaped incident portion for allowing incidence of light output from the light guide, and a part of the perimeter portion may be the incident portion.

In a case where the above configuration is employed, the light guide is in contact with or proximate to the incident portion, which is formed on a middle portion of the perimeter portion in the tubular axis direction, and the incident portion of the perimeter portion is formed into an annular shape in conformity with a shape (annular shape) of the light guide. Therefore, it is possible to efficiently allow incidence of light output from the light guide to the perimeter portion of the outer glass.

In the vehicular illumination device according to this aspect, the perimeter portion may include an output portion on a front end portion of the perimeter portion, the output portion outputting the guided light forwardly in a periphery of the front surface portion.

In a case where the above configuration is employed, forming the output portion on the front end portion of the perimeter portion enables to output light from a position further on the front side of the vehicle. This is advantageous in achieving enhanced design.

In the vehicular illumination device according to this aspect, the outer glass may be configured such that the front surface portion and the perimeter portion are integrally formed with each other, and the output portion may be formed on a front side with respect to a connecting portion between the front surface portion and the perimeter portion.

In a case where the above configuration is employed, disposing the output portion of the outer glass on the front side with respect to the connecting portion between the front surface portion and the perimeter portion allows light from the second light source portion via the light guide, and the perimeter portion of the outer glass to be more clearly visible. This is advantageous in achieving enhanced design.

Further, in a case where the above configuration is employed, integrally forming the front surface portion and the perimeter portion of the outer glass enables to suppress random reflection of light on a connecting portion between the front surface portion and the perimeter portion. This is more advantageous in achieving enhanced design.

In the vehicular illumination device according to this aspect, a reflecting portion having a convexo-concave structure and configured to reflect the guided light forwardly may be formed on a back surface portion of the light guide, and a convexo-concave height of the reflecting portion may be gradually changed along a length direction of the light guide.

In a case where the above configuration is employed, forming the reflecting portion having a convexo-concave structure on the back surface portion of the light guide enables to more efficiently output light guided through the light guide forwardly.

Further, in a case where the above configuration is employed, gradually changing a height of a convexo-concave structure constituting the reflecting portion in a length direction of the light guide enables to uniformly or gradually change an intensity of output light in the length direction. This is more advantageous in achieving enhanced design.

The vehicular illumination device according to this aspect may further include, when it is assumed that the light guide is a first light guide, a second light guide formed outside the outer glass, and configured to allow incidence of a part of light output from the second light source portion via the outer glass, and output the incident light forwardly of the vehicle, while guiding the incident light.

In a case where the above configuration is employed, since the illumination device also includes the second light guide configured to allow incidence of a part of light output from the second light source portion to emit light, it is possible to dispose a plurality of light emitting portions mounted on the headlight without increasing the number of light sources. This is more advantageous in achieving enhanced design.

A vehicular illumination device according to another aspect of the embodiment is a vehicular illumination device provided on a front portion of a vehicle. The illumination device includes a headlight as a first light source portion capable of radiating light forwardly of the vehicle; a second light source portion provided separately of the headlight; a first light guide mounted on the headlight, and configured to allow incidence of light output from the second light source portion and output light outwardly, while guiding the light; and a second light guide mounted on the headlight, and configured to allow incidence of light output from the second light source portion, and output light outwardly and forwardly of the vehicle, while guiding the light.

In the vehicular illumination device according to this aspect, since the first light guide and the second light guide mounted on the headlight respectively function as light emitting portions for outputting light from the second light source portion, it is possible to let an oncoming vehicle, a pedestrian, and the like notify a position and a traveling direction of an own vehicle. This is advantageous in terms of function and design.

Further, in the vehicular illumination device according to this aspect, distributing light output from the second light source portion between the first light guide and the second light guide allows the first light guide and the second light guide to output light (function as light emitting portions). Therefore, in the illumination device according to this aspect, unlike the technique disclosed in Japanese Unexamined Patent Application Publication No. 2018-32512 in which a second light source portion is provided for each light emitting portion, it is possible to reduce the number of second light source portions. This enables to reduce the weight and the production cost of the vehicle.

The vehicular illumination device according to this aspect may further include: a third light guide disposed to extend forwardly of the vehicle from a position where the second light source portion is disposed, and configured to guide light output from the second light source portion; and a fourth light guide branched from the third light guide, connected to the first light guide, and configured to guide a part of the light guided through the third light guide to the first light guide. A part of the light output from the second light source portion may be guided to the first light guide via the third light guide and the fourth light guide, and a remaining part of the light output from the second light source portion may be guided to the second light guide via the third light guide.

In a case where the above configuration is employed, light is guided to the first light guide via the fourth light guide branched from the third light guide, and light is also guided from the third light guide to the second light guide. Thus, as compared with a case where light propagates through a space, it is possible to securely guide light to the first light guide and the second light guide with less attenuation.

In the vehicular illumination device according to this aspect, the first light guide may have an annular shape, and the fourth light guide may include a first branch portion for guiding light toward one side of the first light guide in a circumferential direction, and a second branch portion for guiding light toward the other side of the first light guide in the circumferential direction.

In a case where the above configuration is employed, since light is distributed and guided toward one side and the other side of the first light guide in a circumferential direction by the first branch portion and the second branch portion, as compared with a case where light is guided only toward one side or the other side of a first light guide in a circumferential direction, the illumination device is more advantageous in outputting light of a uniform intensity from the entirety of the annular-shaped first light guide, even when light is attenuated by guiding light.

In the vehicular illumination device according to this aspect, an exterior member disposed adjacent to the headlight, and extending forwardly of the vehicle with respect to the headlight may be formed on a front portion of the vehicle, and a front portion of a connecting portion between the first light guide and the fourth light guide may be covered by a part of the exterior member.

In a case where the above configuration is employed, since the second light guide is formed along a front end portion of the exterior member, when light is output from the second light source portion, it is possible to secure a light emitting pattern along the front end portion of the exterior member. This is advantageous in implementing an illumination device having enhanced design.

Further, in a case where the above configuration is employed, since the front portion of the connecting portion between the first light guide and the fourth light guide is covered from the front side of the vehicle by the part of the exterior member, even when light emission fluctuates on each of the connecting portions, light is made invisible from the outside (from the front side of the vehicle) by covering the front portion of the connecting portion by the part of the exterior member.

In the illumination device according to this aspect, the first light guide may be disposed to surround a periphery of the headlight, when viewed from the front side.

In a case where the above configuration is employed, when light is output from the second light source portion, light is output from the first light guide, which is disposed to surround a periphery of the headlight. Therefore, in a case where the above configuration is employed, it is possible to implement an illumination device having enhanced design.

In the vehicular illumination device according to this aspect, the second light source portion may be constituted by one or more semiconductor light emitting elements.

In a case where the above configuration is employed, since the second light source portion is constituted by one or more semiconductor light emitting elements, as compared with a case where a second light source portion is constituted by using a filament electric bulb or the like, it is possible to miniaturize the entirety of the illumination device, and secure a long product life.

As described above, in the vehicular illumination device according to this aspect, it is possible to output light from the light emitting portion forwardly of the vehicle with enhanced design and enhanced visibility, while mounting the light emitting portion on the headlight.

Further, in the illumination device according to this aspect, disposing the plurality of light emitting portions mounted on the headlight enables to reduce the weight and the production cost of the vehicle, while providing an enhanced function and enhanced design.

This application is based on Japanese Patent application Nos. 2018-147453 and 2018-147456 filed in Japan Patent Office on Aug. 6, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicular illumination device provided on a front portion of a vehicle, comprising:
   a headlight as a first light source portion capable of radiating light forwardly of the vehicle;
   an outer glass having light transparency and including a front surface portion for covering a front portion of the headlight and a perimeter portion for surrounding a periphery of the headlight;
   a second light source portion provided separately of the headlight; and
   a light guide disposed in contact with or proximate to a part of the perimeter portion of the outer glass, and configured to allow incidence of light output from the second light source portion and output the incident light to the perimeter portion, while guiding the incident light, wherein
   the light guide has an annular shape to surround a periphery of the headlight,
   the perimeter portion of the outer glass has a tubular shape, and includes an annular-shaped incident portion on a middle portion of the perimeter portion in a tubular axis direction, the annular-shaped incident portion allowing incidence of light output from the light guide, and
   a part of the perimeter portion is the incident portion.

2. The vehicular illumination device according to claim 1, wherein
   the perimeter portion includes an output portion, on a front end portion of the perimeter portion, the output portion outputting the guided light forwardly in a periphery of the front surface portion.

3. The vehicular illumination device according to claim 2, wherein
   the outer glass is configured such that the front surface portion and the perimeter portion are integrally formed with each other, and
   the output portion is formed on a front side with respect to a connecting portion between the front surface portion and the perimeter portion.

4. The vehicular illumination device according to claim 3, wherein
   a reflecting portion having a convexo-concave structure and configured to reflect the guided light forwardly is formed on a back surface portion of the light guide, and
   a convexo-concave height of the reflecting portion is gradually changed along a length direction of the light guide.

5. The vehicular illumination device according to claim 3, further comprising
   when it is assumed that the light guide is a first light guide,
   a second light guide formed outside the outer glass, and configured to allow incidence of a part of light output from the second light source portion via the outer glass, and output the incident light forwardly of the vehicle, while guiding the incident light.

6. The vehicular illumination device according to claim 2, wherein
   a reflecting portion having a convexo-concave structure and configured to reflect the guided light forwardly is formed on a back surface portion of the light guide, and
   a convexo-concave height of the reflecting portion is gradually changed along a length direction of the light guide.

7. The vehicular illumination device according to claim 2, further comprising
   when it is assumed that the light guide is a first light guide,
   a second light guide formed outside the outer glass, and configured to allow incidence of a part of light output from the second light source portion via the outer glass, and output the incident light forwardly of the vehicle, while guiding the incident light.

8. The vehicular illumination device according to claim 1, wherein
   a reflecting portion having a convexo-concave structure and configured to reflect the guided light forwardly is formed on a back surface portion of the light guide, and
   a convexo-concave height of the reflecting portion is gradually changed along a length direction of the light guide.

9. The vehicular illumination device according to claim 8, further comprising
   when it is assumed that the light guide is a first light guide,
   a second light guide formed outside the outer glass, and configured to allow incidence of a part of light output from the second light source portion via the outer glass, and output the incident light forwardly of the vehicle, while guiding the incident light.

10. The vehicular illumination device according to claim 1, further comprising
    when it is assumed that the light guide is a first light guide,
    a second light guide formed outside the outer glass, and configured to allow incidence of a part of light output from the second light source portion via the outer glass, and output the incident light forwardly of the vehicle, while guiding the incident light.

11. The vehicular illumination device according to claim 10, further comprising:
    a third light guide disposed to extend forwardly of the vehicle from a position where the second light source portion is disposed, and configured to guide light output from the second light source portion; and
    a fourth light guide branched from the third light guide, connected to the first light guide, and configured to guide a part of the light guided through the third light guide to the first light guide, wherein a part of the light output from the second light source portion is guided to the first light guide via the third light guide and the fourth light guide, and a remaining part of the light output from the second light source portion is guided to the second light guide via the third light guide.

12. The vehicular illumination device according to claim 11, wherein
the first light guide has an annular shape, and
the fourth light guide includes a first branch portion for guiding light toward one side of the first light guide in a circumferential direction, and a second branch portion for guiding light toward the other side of the first light guide in the circumferential direction.

13. The vehicular illumination device according to claim 11, wherein
an exterior member disposed adjacent to the headlight, and extending forwardly of the vehicle with respect to the headlight is formed on a front portion of the vehicle, and
a front portion of a connecting portion between the first light guide and the fourth light guide is covered by a part of the exterior member.

14. The vehicular illumination device according to claim 12, wherein
the second light guide is formed along a front end portion of the exterior member.

15. The vehicular illumination device according to claim 12, wherein
an exterior member disposed adjacent to the headlight, and extending forwardly of the vehicle with respect to the headlight is formed on a front portion of the vehicle, and
a front portion of a connecting portion between the first light guide and the fourth light guide is covered by a part of the exterior member.

16. The vehicular illumination device according to claim 1, wherein
the second light source portion is constituted by one or more semiconductor light emitting elements.

\* \* \* \* \*